Patented Feb. 28, 1933

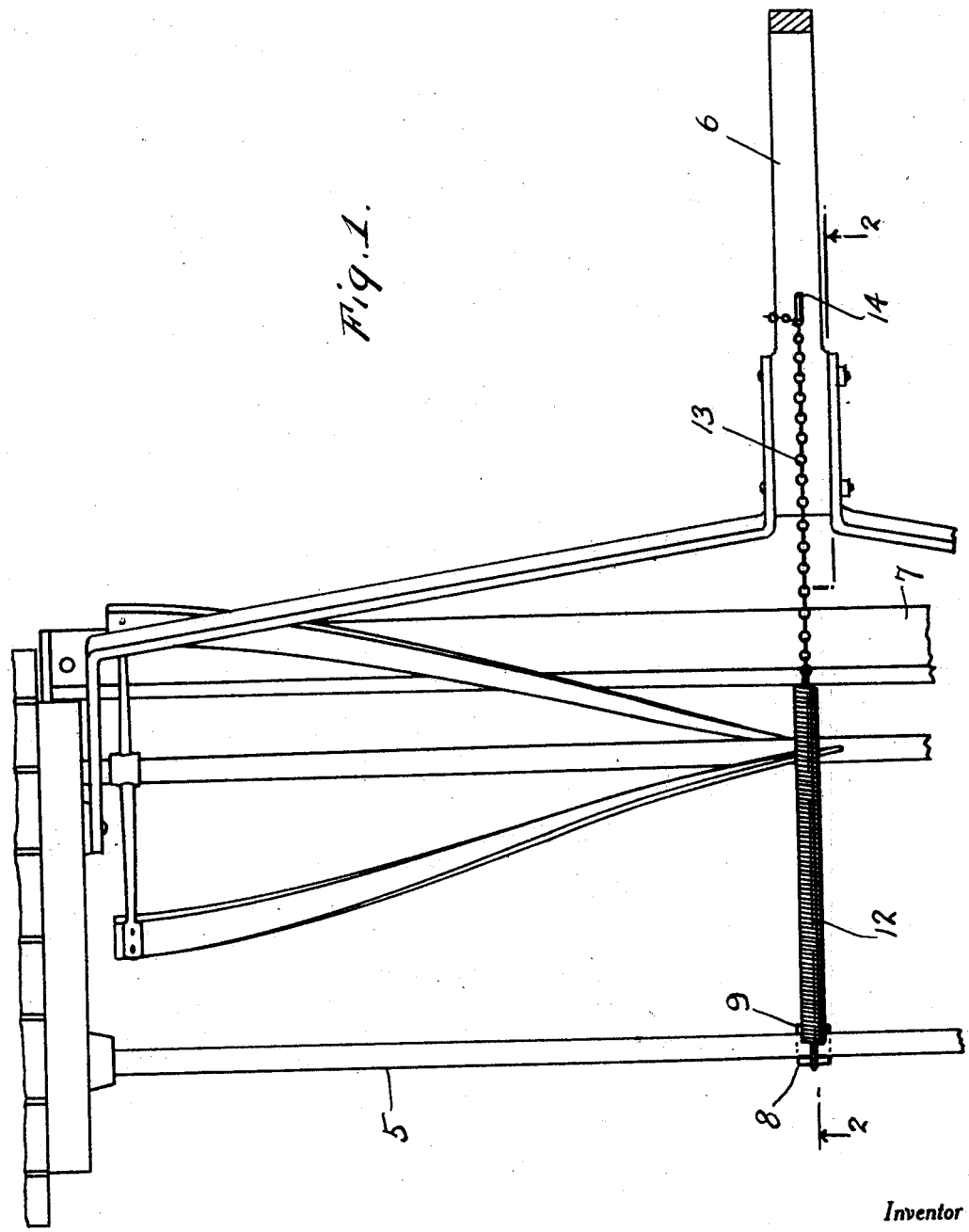

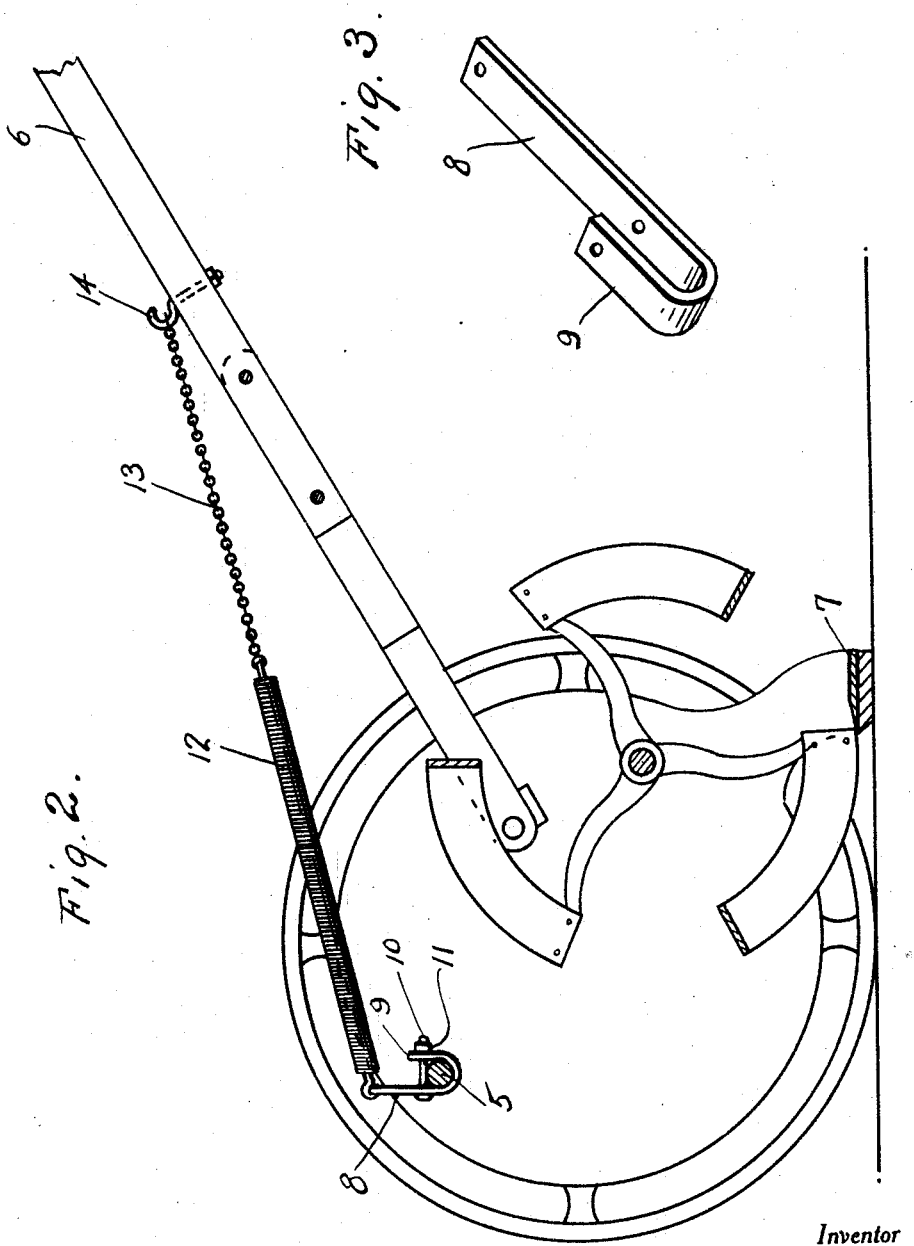

1,899,305

UNITED STATES PATENT OFFICE

WILLIAM M. BLEY, OF ROUND GROVE, ILLINOIS

LAWN-MOWER ATTACHMENT

Application filed October 31, 1931. Serial No. 572,414.

This invention relates broadly to lawn mowers and the primary object of the invention is to provide means for retaining the fixed cutting blade of the lawn mower from jumping up and down as the lawn mower is moved over the turf thus insuring the cutting of the grass in an even manner, the present objection being, that the cutting blade being permitted this up and down movement, results in a ragged or irregular cutting of the grass.

Briefly, the invention consists in the provision of an elastic connection between the handle of the lawn mower and the bumper bar for that bar of the lawn mower which extends between and connects the gear housing usually provided on the wheels of the lawn mower, together with means for regulating tension of the elastic connection.

Other objects and advantages of the invention will become apparent from a study of the following description, taken in connection with the accompanying drawings wherein:

Figure 1 is a plan view of a portion of a lawn mower having my invention applied thereto.

Figure 2 is a sectional view taken substantially on the line 2—2 of Figure 1.

Figure 3 is a perspective view of a clamp.

Referring more in detail to the drawings, it will be seen that I have shown the invention as applied to a conventional type of lawn mower, the only part of which to be hereinafter more specifically referred to, being such parts of the lawn mower as the present invention is concerned. Such parts are the bumper bar 5, that extends between the gear casings of the lawn mower adjacent the front of the mower, the handle 6, and the fixed cutting blade 7.

In carrying out my invention, and in the preferred form thereof, there is provided a clamp 8 that is preferably made of strap iron and adjacent one end provided with a return bend to provide a substantially U-shaped part 9 adapted to straddle the bumper bar 5.

Opposed portions of the bar forming the U 9 are apertured and receive a retaining bolt 10 that at its outer end has threadedly engaged therewith a nut 11. Obviously, through the medium of the nut and bolt means, the opposed portions of the U may be contracted about the bar 5 to secure the clamp 8 in position thereon against casual displacement, and with the end of the clamp 8 extending upwardly.

The uppermost end of the clamp is apertured for accommodating one end of a coil spring 12. To the free end of the coil spring 12 there is connected one end of a length of chain 13 that is adapted to have a selected one of its links engaged with a hook 14 suitably mounted on the handle 6 adjacent the lower end thereof. Obviously, by placing a desired link of the chain 13 engaged with the hook 14, the desired tension on spring 12 may be obtained.

From the foregoing, it will be seen that I have provided adjustable elastic means for connecting the handle 6 of the lawn mower with the bumper bar 5 of the lawn mower and this connection serves to retain the blade 7 parallel to the ground, preventing the up and down movement of the blade 7 to which movement the blade is often subjected, during cutting.

Even though I have herein shown and described the preferred embodiment of the invention, it is to be understood that the same is susceptible of further changes, modifications and improvements coming within the scope of the appended claim.

Having thus described my invention, what I claim as new is:

An attachment for a lawn mower including a handle, a rotary cutter reel and a bumper bar located in front of the reel and slightly below the horizontal plane of the top part of the reel, comprising a U-shaped bracket having one limb longer than its other, and said bracket fitting over the bar with its limbs extending upwardly therefrom, a bolt passing through an intermediate portion of the long limb and through the upper end of the short limb for clamping the bracket to the bar, a spring connected to the upper end of the long limb, a hook on the handle, and a chain connecting the spring with said hook.

In testimony whereof I affix my signature.

WILLIAM M. BLEY.